(12) United States Patent
Dam et al.

(10) Patent No.: US 7,694,560 B1
(45) Date of Patent: Apr. 13, 2010

(54) NON-INVASIVE BOTTOM UP CONTINUOUS LIQUID LEVEL TRANSMITTER

(75) Inventors: Naim Dam, Muttontown, NY (US); Andre Granin, Wantagh, NY (US); Glen Melder, Lake Ronkonkoma, NY (US)

(73) Assignee: Cosense, Inc., Hauppauge, NY (US)

( * ) Notice: Subject to any disclaimer, the term of this patent is extended or adjusted under 35 U.S.C. 154(b) by 278 days.

(21) Appl. No.: 11/810,785

(22) Filed: Jun. 7, 2007

(51) Int. Cl.
*G01F 23/28* (2006.01)

(52) U.S. Cl. .................................... 73/290 V

(58) Field of Classification Search ............... 73/290 V; 367/908; 340/621
See application file for complete search history.

(56) References Cited

U.S. PATENT DOCUMENTS

| | | | | |
|---|---|---|---|---|
| 4,480,468 A | * | 11/1984 | Sinha | 73/290 V |
| 4,815,323 A | * | 3/1989 | Ellinger et al. | 73/290 V |
| 6,412,344 B1 | * | 7/2002 | Danicich et al. | 73/290 V |
| 2009/0205419 A1 | * | 8/2009 | Volkwein et al. | 73/290 V |

* cited by examiner

*Primary Examiner*—Hezron Williams
*Assistant Examiner*—Nathaniel Kolb
(74) *Attorney, Agent, or Firm*—Gordon D. Coplein

(57) ABSTRACT

Apparatus for measuring the level of liquid in a container has a substrate on which a plurality of piezoelectric elements are mounted that are to transmit ultrasonic energy upwardly through the bottom of a container placed on and supported by the substrate into the container and to receive ultrasonic energy reflected back from the liquid/air interface within the container from which the round trip time can be measured and the liquid level calculated. The plurality of piezoelectric elements are of predetermined shapes and mounted spaced apart on the substrate in an array to accommodate containers with different shape bottoms.

15 Claims, 5 Drawing Sheets

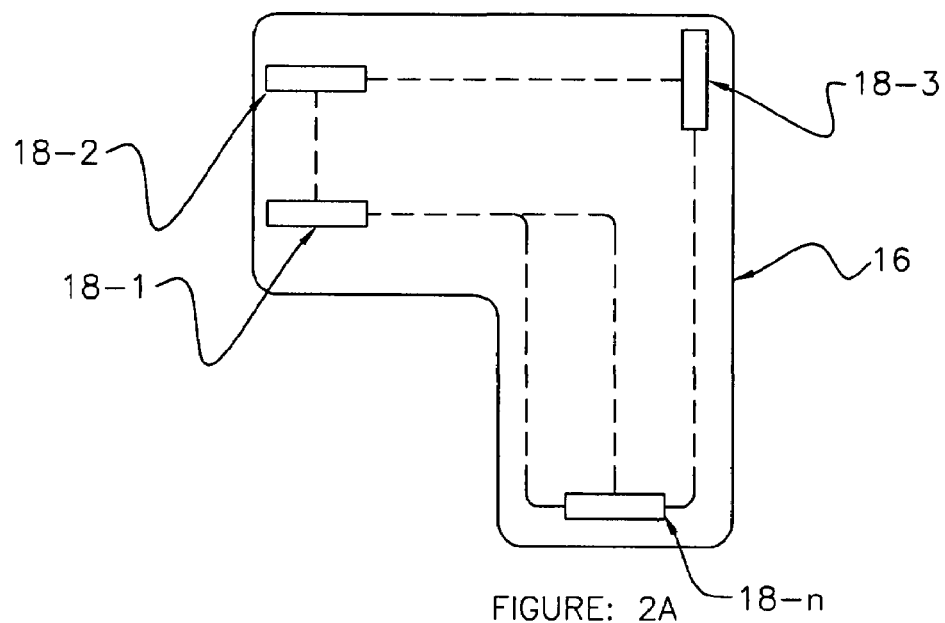
FIGURE: 2A
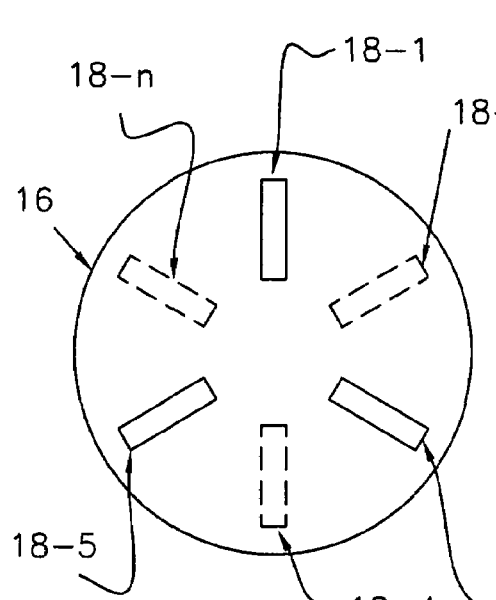
FIGURE: 2B
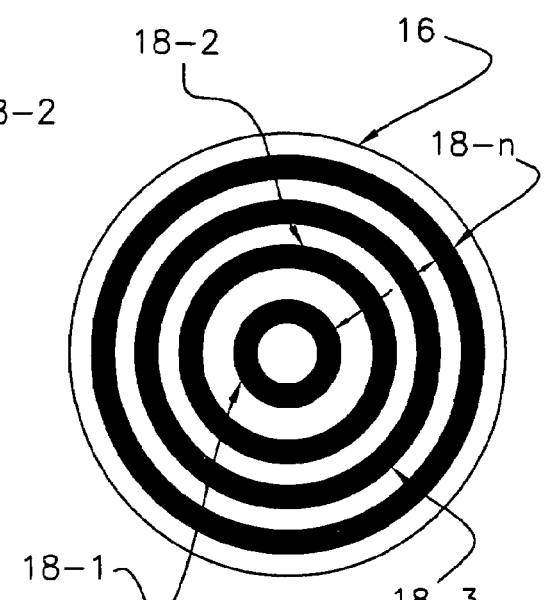
FIGURE: 2C

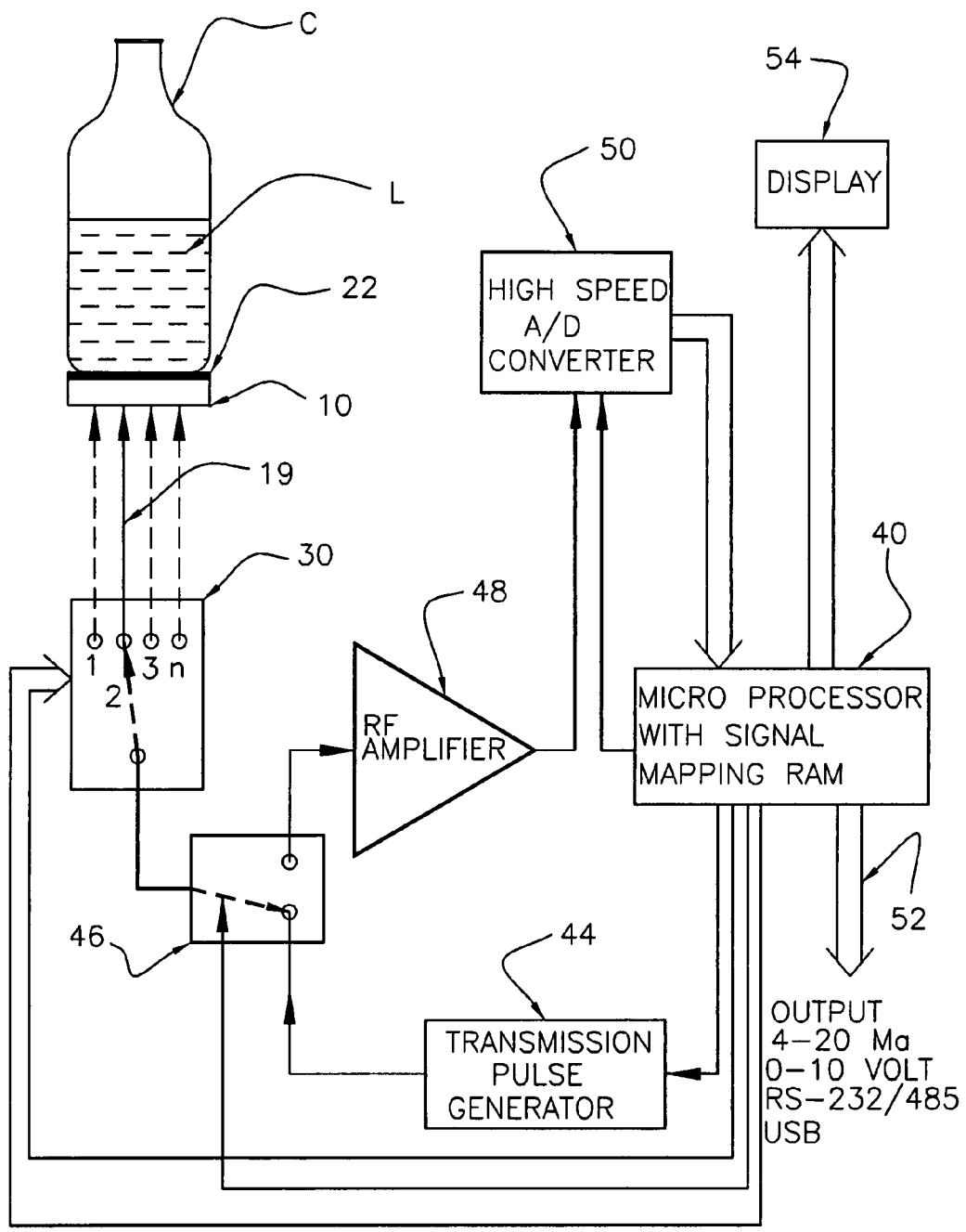
FIGURE: 3

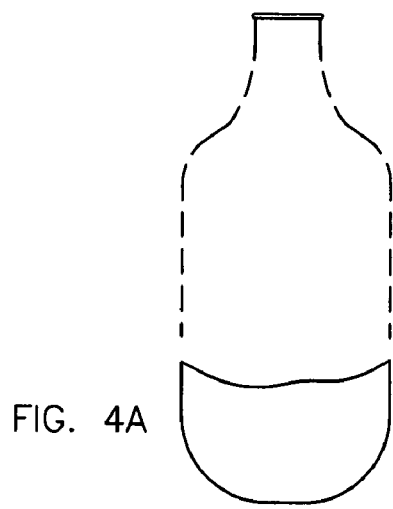
FIG. 4A
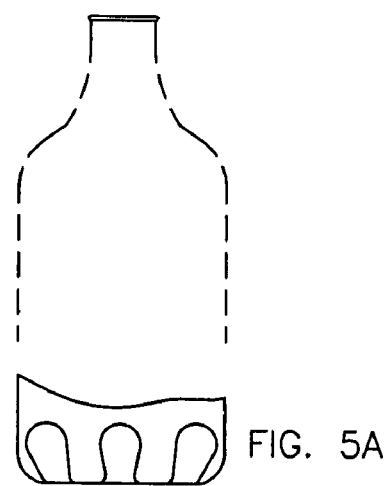
FIG. 5A
FIG. 4B
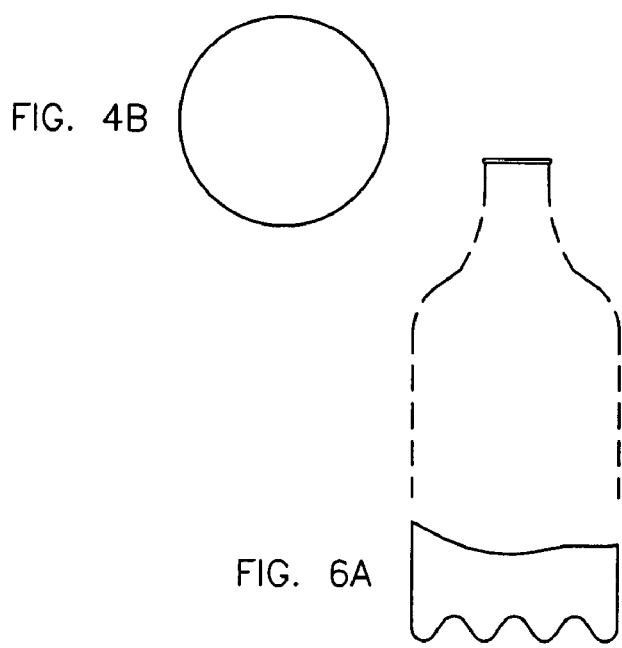
FIG. 5B
FIG. 6A
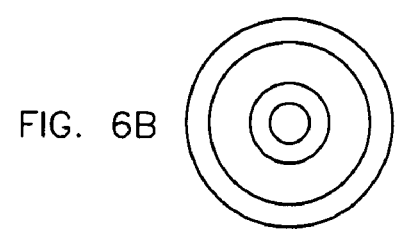
FIG. 6B

NON-INVASIVE BOTTOM UP CONTINUOUS LIQUID LEVEL TRANSMITTER

FIELDS OF THE INVENTION

The invention relates to an ultrasonic system with a non-invasive transducer for measuring the liquid level in containers of various shapes from the bottom up

BACKGROUND OF THE INVENTION

Medical biotechnology, semiconductor, automated laboratory and other industries use containers, such as bottles, which store chemicals reagents, waste liquid and other materials. Such bottles have different shapes and sizes with irregularities and different construction at the bottom of each bottle. Also, sometimes these industries fill different types of liquid in the same bottle type or use different bottle types with the same type of liquid. In both cases, a user has no knowledge of the full/empty condition of a liquid in the bottle. This may damage or delay manufacturing and analysis processes due to lack of reagents not being known to be available or to cause overflow of the container if already filled completely, which possibly can be hazardous.

It is known in the art to use ultrasonic measuring systems to determine the level of a liquid in a container. When the container is large, such as an open tank, an invasive transducer is used in which a hole is made in the wall. An ultrasonic transducer is mounted in the hole and the transducer comes in contact with the liquid. Where the liquid is to be in a bottle, it is not usually possible to use an invasive transducer. Also, if the liquid in the bottle is to be kept in a sterile condition a transducer coming in contact with the liquid would spoil the sterility. In such cases, a non-invasive ultrasonic transducer is used. Such a transducer is usually mounted on the outside surface of the container by a mechanical arrangement or by an adhesive. It also requires the application of a coupling substance, such as a gel, between the transducer and the container surface. Therefore, mounting of a liquid level transducer either removably or permanently can be costly and time consuming.

Accordingly it would be advantageous to be able to provide an ultrasonic liquid level measuring system having a non-invasive transducer that can be used with containers of different shapes without having to mount the transducer to the container to achieve the measurement.

BRIEF DESCRIPTION OF THE INVENTION

The present invention is directed to a system that uses a non-invasive transducer to measure liquid level in a container from the bottom up on a continuous basis. In accordance with the invention, one or more transducers, which typically are piezoelectric elements, are mounted on a substrate or platform that is housed in a base and the container is placed on the substrate. There is an interface between the container bottom and the container formed by a material that provides coupling between the container bottom and the transducer. Such a material is preferably dry and can be, for example, soft rubber or high density urethane foam. This permits ultrasonic energy to be transmitted by a transducer element through the container bottom wall into the container and received by the transducer element after reflection from the liquid/air interface in the container. In a preferred embodiment of the invention an array of transducers is provided on the substrate so that containers having bottoms of different types and shapes can automatically be accommodated. The transducers can be energized all at the same time or sequentially. Measurement of the liquid level is accomplished without the need for mounting a transducer and separately applied coupling compound to the container outer surface. Liquid level is measured continuously by simply placing a container on the substrate.

BRIEF DESCRIPTION OF THE DRAWINGS

Other objects and advantages of the invention will become more apparent upon reference to the following specification and annexed drawings in which:

FIGS. 2A, 2B and 2C are top views showing different patterns of the ultrasonic transducer element arrays used with the base of FIG. 1;

FIG. 3 is a system block diagram;

FIGS. 4A-4B through 9A-9B show elevational and bottom plan views of different types of containers.

DETAILED DESCRIPTION OF THE INVENTION

FIGS. 4A-4B through 9A-9B show various type of containers for which it is desired to measure their liquid contents. The containers are all shown as being bottles that have bottoms of different shapes. The bottles are conventional and can be made either of glass or plastic material. Plastic bottles are either blow molded or injection molded. In either case, the wall thickness is uniform and the liquid in the bottle extends into the lowest part of the bottle. Glass bottles typically have a flat internal bottom wall. While the invention is illustratively described with respect to bottles, it has application to all forms of containers that hold a liquid that can be present at the very bottom of the container and the container is of a material though which ultrasonic energy can be transmitted.

Figure 7A:
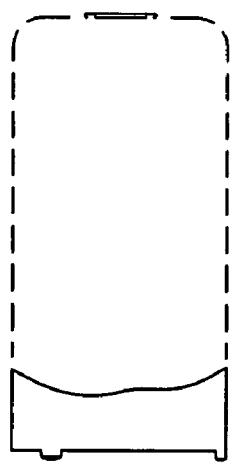
Figure 8A:
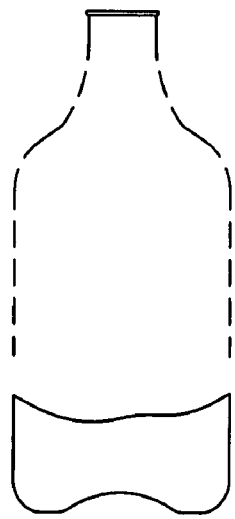
Figure 7B:
Figure 8B:
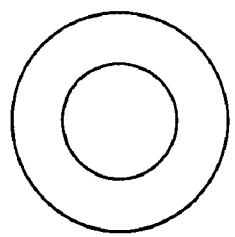
Figure 9A:
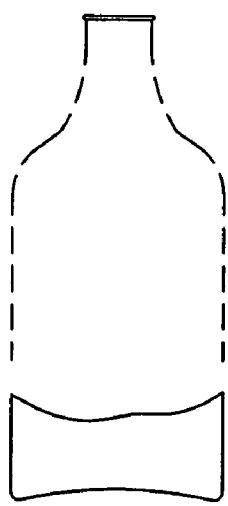
Figure 9B:
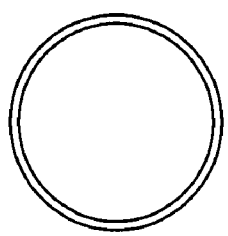

The bottle of FIGS. 4A-4B has a convex bottom with a flat central portion; that of FIGS. 5A-5B a star shaped bottom that is flat in the arms of the star; that of FIGS. 6A-6B a multi-ridge bottom; that of FIGS. 7A-7B a bottle with foot locators; that of FIGS. 8A-8B one with a bottom having an outer convex and inner concave bottom; and that of FIGS. 9A-9B one with a concave bottom. In each case the level of the liquid, if any, in the container is to be measured. As should be apparent, it would be desirable to measure the liquid content in each of the types of bottles in as simple a manner as possible.

Figure 1:
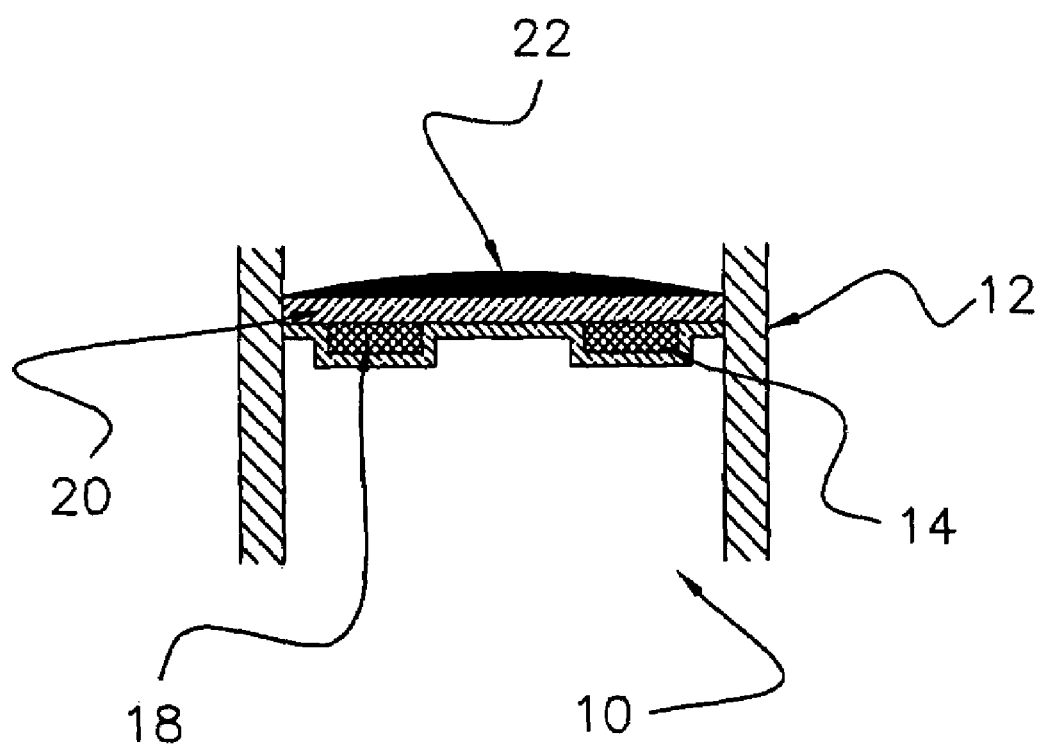
FIG. 1 is an elevational cross-section of the base having a substrate on which a container is to be placed.

FIG. 1 is a cross-section of a base 10 of a part of the system of the invention by which the presence and amount of liquid in containers having any of the shapes of bottoms as shown in FIGS. 4-9 and other shapes can be measured. Base 10 has a housing 12 of any suitable material such as ABS plastic or of solid TEFLON or material coated with TEFLON if the containers hold corrosive material. The base 10 has an internal shelf wall 14 which can be continuous or in segments. A substrate or platform 16 of an electrically insulating material, such as that used for printed circuit boards, rests on the shelf and is held in place by mechanical fasteners or by an adhesive, such as epoxy (not shown). One or more piezoelectric transducer elements 18 are mounted on the substrate 16. The elements 18 are of a suitable material such as PZT (lead zirconate titanate piezoelectric ceramic material) or PVDF (polyvinylidene difluoride). Leads (not shown) are connected to each element 18 and are connected to a circuit, to be described below.

A layer of a matching material 20, such as TEFLON or Epoxy 302 manufactured by Merco Technology is mounted on the substrate to overlie the one or more elements 18. The matching material layer typically has a thickness of ¼ wavelength of the frequency of the energy applied to the element. A layer of a coupling material 22 is on top of the matching material. The coupling material 22 can be for, example, soft valcanized rubber or high density urethane foam such as Scotch 4010 heavy duty mounting tape manufactured by 3M Corporation. The coupling material preferably is "dry". That is, a container can be placed on the coupling layer 22 and there will be no residue left on the container bottom when it is removed. The 3M 1040 tape is a double sided adhesive tape, with the adhesive material being acrylic. When this is used, one side of the tape is adhered to the layer of matching material. The adhesive on the opposing side on which the bottle is placed does not adhere to the container bottom. The weight of the container and any liquid in it aids in effecting the coupling through the material 22 so that ultrasonic energy can pass from a transducer element 18 to the bottom of a container and into the liquid within the container and then the energy reflected from the air-liquid interface within the container pass through the container bottom back to an element 18.

In a typical embodiment of the elements of the base 10:

| Frequency of operation | 250 KHz-5 MHZ |
| --- | --- |
| Element material | PVDF or PZT |
| matching layer material | Epoxy 302 manufactured by TEFLON |
| matching layer thickness | Quarter wave at the operating frequency |
| coupling layer material | soft rubber, high density urethane foam, 3M 4010 tape material |
| coupling layer thickness | 0.75 mm to 6.0 mm depending upon transducer operating frequency |
| container material | plastic, glass, metal |
| container bottom diameter | 2" to 12" |
| container bottom wall thickness | 0.1 mm to 12 mm |

The frequency range from 250 KHZ to 5 MHZ and other parameters of the elements of the base largely depend on container wall thickness, material of the container wall, and also the liquid level height to be measured.

FIGS. 2A, 2B and 2C shows the details of different types of substrates 16 mounted in the top of the base 10. Each type has an array of a plurality of the piezoelectric transducer elements designated 18-1, 18-2 . . . 18-n arranged in a different pattern. In FIG. 2A the substrate 16 and its layers of matching material and coupling material that fit in the top of the base 10 are of inverted L shape and have elongated bar like piezoelectric elements 18. This is to be used with a special shape container similar to that shown in FIG. 7. Two elements 18-1 and 18-2 are at the end of a first leg of the L spaced apart parallel to each other and aligned along the length of the leg. Another element 18-3 is transverse to the first two at the corner of the junction of the two legs of the L. A fourth piezoelectric element 18-n is parallel to the first two and lies transverse to the L second leg at its end. There can be more than the four elements 18 that are shown.

The elements 18 have leads that are used to connect all of them in parallel, individually or in groups to be connected to an electronic circuit, as described below. This depends upon the shapes of the bottoms of the containers to be placed on the base substrate 16 and the manner in which the liquid level measurement is to be made and its result computed. As should be apparent, the feet of the bottom of the bottle of FIG. 7 will rest on the layer of coupling material 22 above the arrangement of elements 18 as shown in FIG. 2A so that there can be transmission of ultrasonic energy into the bottle to determine the level of the liquid in it.

FIG. 2B shows a circular substrate 16 with elongated bar shaped piezoelectric transducer elements 18-1 . . . 18-n mounted in a wheel spoke like configuration. While the substrate 16 is shown as being circular, it could be square or rectangular and the active field containing the elements 18 outlined by a marking or mechanical stops on top of the substrate. As previously described, there is a layer of a matching material 20 over the elements and a layer of a coupling material 22 over the matching material layer. The leads connected to the elements 18 permit their use individually, all together, or in one or more groups. In the configuration of element array of FIG. 2B, the elements are more likely operated all together. As should be apparent, all of the different shape bottle bottoms of FIGS. 4-9 will have a bottom part that will rest on the coupling material layer 22 of the spoke like configuration of the elements 18 so that there can be transmission of ultrasonic energy upwardly into the bottle to measure the level of the liquid in it.

In FIG. 2C the elements 18 are of circular ring shape mounted concentrically on a substrate 16. Here also the substrate can be square or rectangular and markings or mechanical stops used to designate the active field of the elements. Again, the leads connected to the elements 18 permit their use individually or in one or more groups. In the configuration of element array of FIG. 2C, the elements are more likely to be operated individually. The bottles having bottoms of the shapes of all of FIGS. 4-9 will have a part that will rest on the coupling material layer above one or more of the elements 18. If desired, some or all of the ring shaped elements 18 can be segmented into arcuate sections with each section being an individual element.

FIG. 3 is a system block diagram explaining the operation of the continuous level measurement of the invention. The base 10 of FIG. 1 is shown with a container C, illustratively shown as a bottle, that contains a quantity of a liquid L and has its bottom resting on the coupling material layer 22 of the substrate 16. As explained above, below the layer of coupling material 22 is an array of one or more of the piezoelectric transducer elements 18 as shown in any one of FIGS. 2A-2C or some other array. The lead or leads 19 that are connected to the elements 18 are connected to a bi-directional multiplexer 30 that is connected to one output of a conventional microprocessor 40. The microprocessor 40 is suitably programmed to control the operation of the instrument, including the multiplexer, and also to perform the necessary calculations for the continuous level measurement. The multiplexer 30 is used if each of the elements 18 is to be individually operated. If all of the transducer elements 18 are connected in parallel, then the multiplexer is not needed.

The microprocessor 40 has an output that controls a pulse generator 44 by gating it on and off to produce a single pulse or a train of pulses for a predetermined period of time at predetermined frequency, such as from 500 Khz to 5 MHZ. Any frequency appropriate to the other circuit components and parameters of the container can be used. The microprocessor 40 also controls a gating switch 46. Switch 46 operates in one state to direct the energy pulses from generator 44 to the multiplexer 30 for application to a piezoelectric element 18 selected by the multiplexer under control of the microprocessor for transmission upwardly through the bottle bottom wall into the liquid and to the liquid/air interface in the bottle. In another state the switch 46 directs energy pulses received by an element 18 after reflection from the liquid air interface in the bottle to an RF amplifier 48 preferably of the high gain type.

The microprocessor 40 is programmed to cause application of ultrasonic energy pulses from the generator 44 to the multiplexer 30 and to one or more of the piezoelectric elements 18 on a periodic basis with enough time between any two successive pulses of the energy reflected from the liquid/air interface to be returned through the switch 46 to the RF amplifier 48. The multiplexer 30 is operated to perform this function sequentially or on some other type of pattern for each of the elements 18 of the array in the base 10.

The output of the RF amplifier is applied to the input of a high speed analog to digital converter 50. The analog/digital converter 50 is gated on by a signal from the microprocessor 40 at the time when an element 18 transmits a pulse of energy into the bottle. The energy pulse reflected from the liquid/air interface in the bottle is received at the analog to digital converter 50 and stops the count. The count between start and stop is a measure of the time that it took for an energy pulse to travel from an element 18 to the liquid/air interface in the bottle and back. This is measure of the height of the liquid within the bottle. The microprocessor 40 calculates the measurement of the round trip time of the energy pulse and from this time measurement calculates the liquid level height. This provides continuous liquid level information.

The measurement of the liquid level can be computed in several ways. There can be only one pulse transmitted and received by each element 18 under control of the multiplexer 40 as it cycles throughout the array of elements on the substrate 16. The digital value of the round trip times for all of the elements 18 can be accumulated in a memory in the microprocessor and averaged. Zero or minimal values can be discarded and the final round trip time result be an average of the accumulated values.

In a preferred embodiment, the microprocessor 40 operates in a manner such that a train of pulses are produced by generator 44 and transmitted by an element 18 to the liquid/air interface during a given time interval. A digital representation is formed by the analog digital converter 50 for each such pulse of the train returned from the liquid/air interface. The output of the analog/digital converter is applied to a memory, which can be built in the converter, which stores the digital value of each returned signal as a sample. A signal mapping circuit in the microprocessor selects from the digital samples stored during a measurement interval the digital sample that corresponds to the largest amplitude of the reflected signal. This will be the most reliable value due to conditions that might exist at the liquid/air interface. That is, the liquid/air interface sometimes is somewhat foamy and the maximum amplitude signal is the most reliable indication of the distance between the transducer element 18 and the liquid/air interface.

The microprocessor 40 can be programmed to carry out the same procedure for each element 18 of the array as it is actuated individually by the multiplexer 30. Here, the values can be averaged and otherwise manipulated as desired. The microprocessor can be programmed to calculate the liquid volume in the bottle If the bottle internal dimensions of the bottle are known. The liquid weight also can be calculated by the microprocessor if the liquid specific density is known.

The microprocessor 40 also has an output 52 of a conventional type, such as 4-20 ma current or 0-10 volts or RS232/RS485 to interface with a personal computer or similar device. The microprocessor 40 also has an output to a conventional display 54 to display results. All of this is well-known.

The bottles can be placed on the base substrate 16 manually or by a mechanized device which can be controlled to remove one bottle and replace it with another in response to a signal from the microprocessor that the required liquid level measurement and other calculations have been completed. Use of a mechanized device permits use of the system in mass production applications. In either of the manual or mechanized cases, no application of a coupling compound or mounting of a transducer is required.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. Apparatus for measuring the level of liquid in a container comprising:
   a substrate having a flat upper surface;
   a plurality of piezoelectric elements mounted spaced apart directly on the lower surface of said substrate in a pattern such as to allow the bottom wall of containers of different sizes and structural configurations placed on said substrate flat upper surface to reside over at least a part of at least one of said plurality of piezoelectric elements;
   a layer of a dry material on said substrate flat upper surface overlying all of said plurality of piezoelectric elements for coupling ultrasonic energy to the bottom of a container placed on said substrate over at least a part of one of said piezoelectric elements; and
   a circuit for providing electrical signals to all of said plurality of piezoelectric elements for conversion to ultrasonic energy to be transmitted upwardly through said substrate and said layer of dry coupling material to the bottom of a container placed on and supported by said substrate flat upper surface and into the container, receiving electrical signals produced by at least one piezoelectric element in response to ultrasonic energy reflected back from the liquid/air interface within the container and transmitted though said layer of dry coupling material and said substrate to said at least one piezoelectric element, and measuring the time between transmission and reception of the ultrasonic energy by said at least one piezoelectric element.

2. Apparatus as claimed in claim 1 further comprising a base in which said substrate is mounted.

3. Apparatus as claimed in claim 1 wherein each of said plurality of piezoelectric elements is elongated.

4. Apparatus as claimed in claim 3 wherein said plurality of elongated piezoelectric elements are mounted directly to said substrate lower surface arrayed in a wheel spoke pattern.

5. Apparatus as claimed in claim 1 wherein each of said plurality of piezoelectric elements is at least part circular.

6. Apparatus as claimed in claim 1 wherein said circuit comprises:
   a generator for producing the electrical signals to be supplied to each of said plurality of piezoelectric elements; and
   a programmed microprocessor that controls said generator to simultaneously supply the electrical signals to all of said plurality of piezoelectric elements.

7. Apparatus as claimed in claim 1 wherein said circuit comprises:
   a generator for producing the electrical signals to be supplied to said plurality of piezoelectric elements;
   a multiplexer;

a programmed microprocessor that controls said generator and said multiplexer to sequentially supply the electrical signals to each of said plurality of piezoelectric elements; and a receiver for receiving the electrical signals from a piezoelectric element that was converted from the ultrasonic energy received by the said element after reflection from the liquid/air interface within the container.

8. Apparatus as claimed in claim 7 further comprising an analog to digital converter connected to said receiver and operated by said microprocessor to produce a count corresponding to the round trip transit time of an energy pulse transmitted from a said element through the container bottom wall and received back after reflection from the liquid/air interface in the container.

9. Apparatus as claimed in claim 8 wherein each of said plurality of piezoelectric elements is elongated.

10. Apparatus as claimed in claim 9 wherein said plurality of elongated elements are arrayed in a wheel spoke pattern.

11. Apparatus as claimed in claim 8 wherein each of said plurality of piezoelectric elements is at least part circular and having differing radii and said plurality of elements are arrayed concentrically.

12. Apparatus as claimed in claim 8 wherein each of said plurality of piezoelectric elements is circular and have differing radii and said plurality of circular elements are arrayed concentrically.

13. Apparatus as claimed in claim 5 wherein said plurality of said part circular piezoelectric elements are arrayed in a pattern of concentric at least partial circles.

14. Apparatus as claimed in claim 1 wherein each of said plurality of piezoelectric elements has a part that directly engages said lower surface of said substrate.

15. Apparatus as claimed in claim 14 wherein the lower surface of said substrate has at least one flat portion and each of said plurality of piezoelectric elements has a flat face that directly engages a corresponding flat portion of said substrate lower surface.

* * * * *